Figure 2:
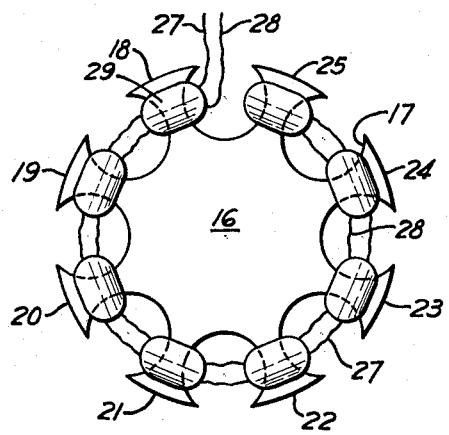

Nov. 24, 1964 L. D. ANDREWS 3,158,797
DEVICE FOR MAGNETIZING CIRCULAR MAGNETS
Filed Oct. 31, 1961 3 Sheets-Sheet 1

INVENTOR.
LEWIS D. ANDREWS
BY
Brown, Critchlow, Flick & Peckham
ATTORNEYS

Nov. 24, 1964    L. D. ANDREWS    3,158,797
DEVICE FOR MAGNETIZING CIRCULAR MAGNETS
Filed Oct. 31, 1961    3 Sheets-Sheet 2

INVENTOR.
LEWIS D. ANDREWS
BY
Brown, Critchlow, Flick & Peckham
ATTORNEYS

Nov. 24, 1964 L. D. ANDREWS 3,158,797
DEVICE FOR MAGNETIZING CIRCULAR MAGNETS
Filed Oct. 31, 1961 3 Sheets-Sheet 3

INVENTOR.
LEWIS D. ANDREWS
BY
Brown, Critchlow, Flick & Peckham
ATTORNEYS

3,158,797
DEVICE FOR MAGNETIZING CIRCULAR
MAGNETS
Lewis D. Andrews, St. Marys, Pa., assignor to Stackpole Carbon Company, St. Marys, Pa., a corporation of Pennsylvania
Filed Oct. 31, 1961, Ser. No. 148,949
4 Claims. (Cl. 317—203)

This invention relates to magnetizing devices, and more particularly to those used for magnetizing circular magnets.

Circular magnets made of ferrites, and referred to herein as ceramic magnets, can be magnetized to provide them with any desired number of north and south radial poles disposed in alternating relation around the axis of each magnet. The same thing can be done with metal magnets, but it is not so effective. If the body that is to be magnetized is solid, it is placed inside a magnetizing device or fixture that is provided with circumferentially spaced poles wound with wire connected in a direct current circuit. On the other hand, if the body is annular, it may be magnetized either by the same fixture or by a magnetizing device inserted in it. In either case, the practice heretofore has been to coil a wire around each pole of the magnetizing device, starting at one pole and continuing around the device until all of the poles have been wrapped with the desired number of turns. One end of the wire is at a given pole, and the other end is at a pole next to it, which is the last pole in the series. The wire therefore extends in only one direction around the fixture. The result is that the current sets up a magnetic field, a portion of which is perpendicular to the desired field, with the result that the magnetizing effect of the fixture is reduced.

It is among the objects of this invention to provide a magnetizing device which is much more efficient than heretofore, and which produces well-defined poles around the body that is magnetized by it.

In accordance with this invention a circular magnetic return member is provided with an even number of laterally spaced radial poles. A continuous electrical conductor has a first portion extending in a predetermined direction around each successive pole and also has a second portion extending in the same direction around each pole. The first portion of the conductor extends from pole to pole substantially entirely around the magnetic return member in one direction, and the second portion of the conductor extends back in reverse direction around that member from pole to pole. Of course, the conductor is insulated from the poles. It will be understood that the conductor makes one turn around the magnetic return member in one direction and then makes one turn in the opposite direction, instead of continuing in the first direction a second time around the return member. Of course, the conductor can extend back and forth around the return member in this manner as many times as desired. The result is that the flux produced by the current flowing around the magnetic return member in one direction is canceled by the flux due to the current flowing in the opposite direction.

The invention is illustrated in the accompanying drawings, in which

Figure 3:
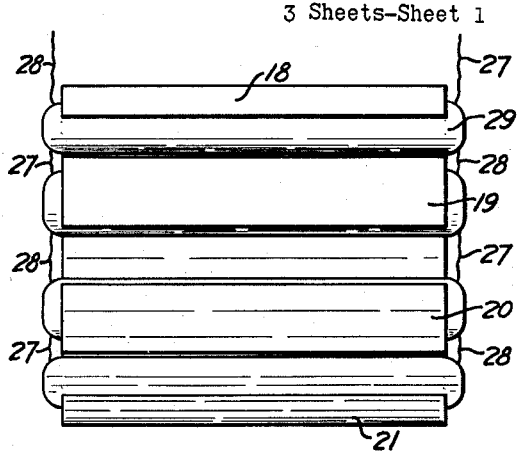
Figure 4:
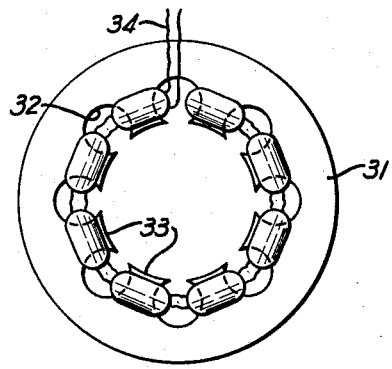
Figure 1:
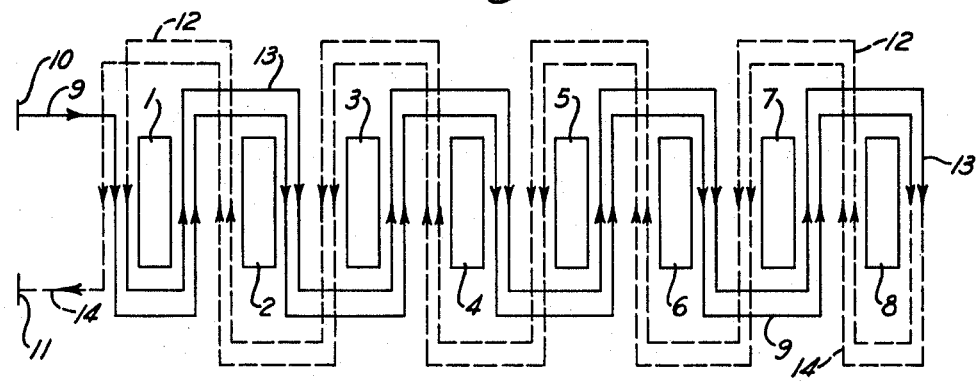
Figure 5:
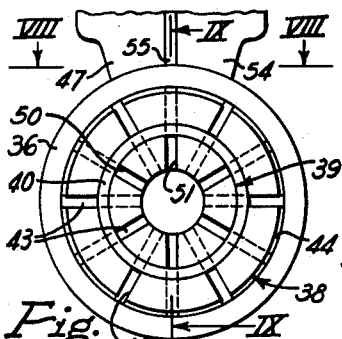
Figure 6:
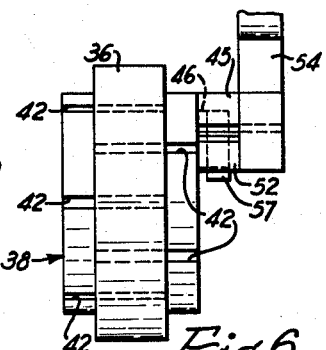
Figure 7:
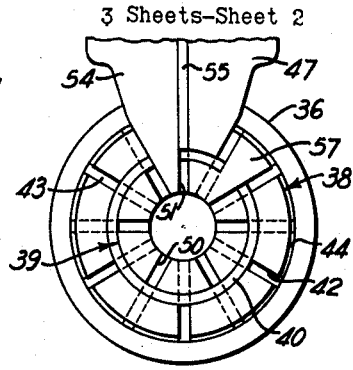
Figure 9:
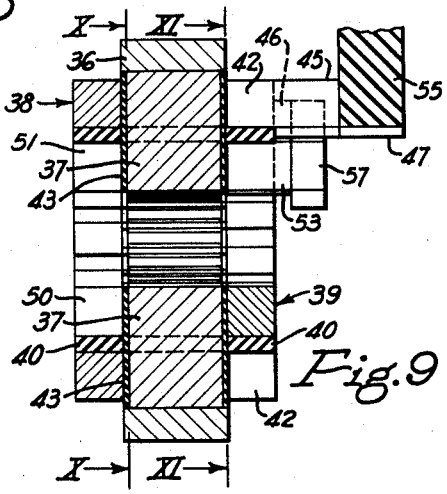
Figure 8:
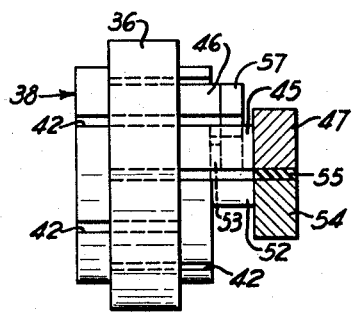
Figure 10:
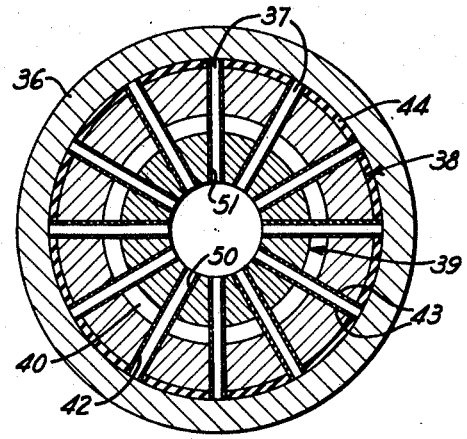
Figure 11:
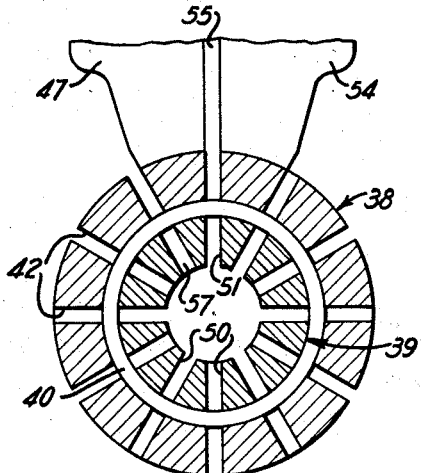
Figure 12:
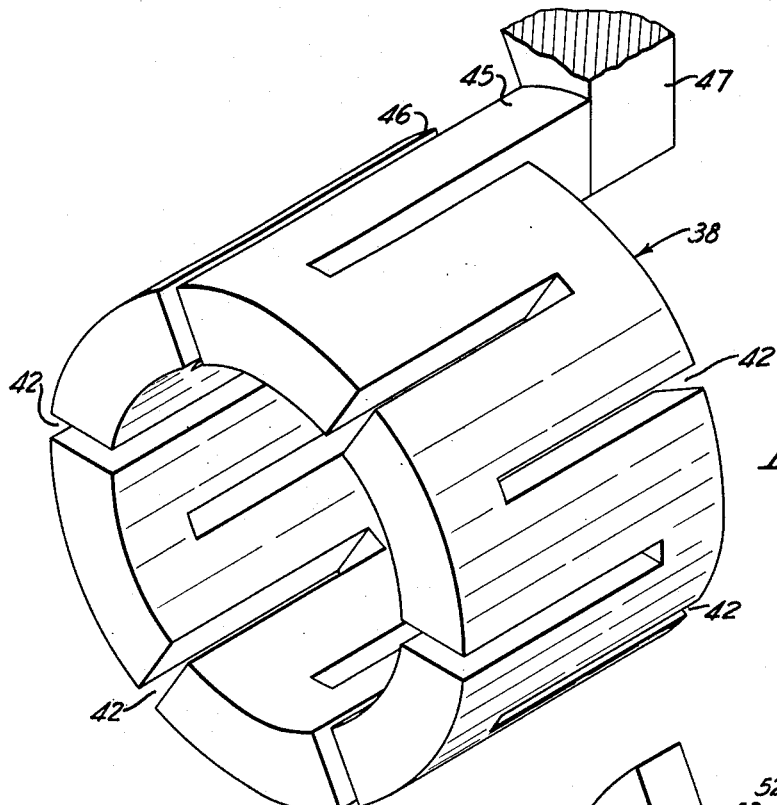
Figure 13:
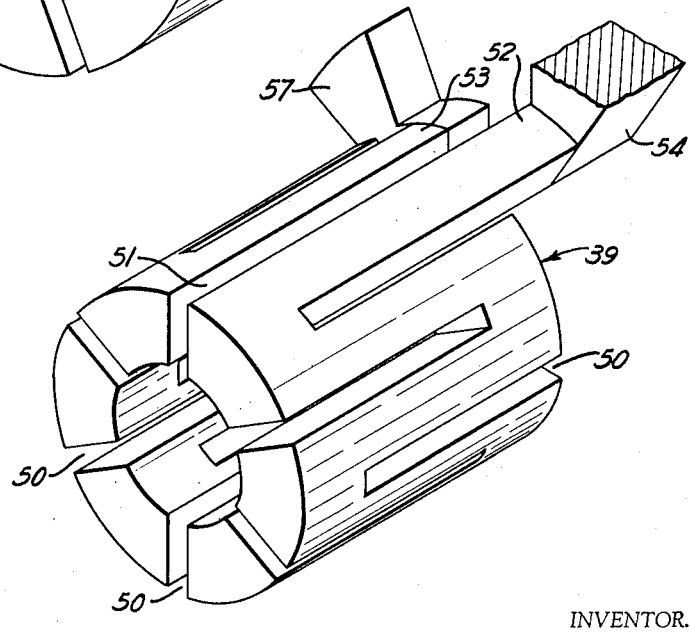

FIG. 1 is a diagram of the magnetizing circuit;
FIG. 2 is an end view of a magnetizing device adapted to be inserted in an annular body that is to be magnetized;
FIG. 3 is a side view of the device;
FIG. 4 is an end view of a modification designed to magnetize an object inside of it;
FIG. 5 is a further embodiment of the invention;
FIG. 6 is a side view thereof;
FIG. 7 is a view of the opposite end of the device shown in FIG. 5;
FIG. 8 is a plan view;
FIG. 9 is an enlarged vertical section taken on the line IX—IX of FIG. 5;
FIGS. 10 and 11 are cross sections taken on the lines X—X and XI—XI, respectively, of FIG. 9; and
FIGS. 12 and 13 are enlarged isometric views of the two sections of the conductor shown in the third embodiment of the invention.

The invention is illustrated diagrammatically in FIG. 1 of the drawings, where a circular row of radial poles 1 to 8, joined to a magnetic return member (not shown), has been projected in a straight line. Of course, there is an even number of poles, eight being shown only as an example. A continuous insulated wire is coiled around the poles in a certain manner. Thus, a first portion 9 of the wire is shown extending from a terminal 10 around each pole in succession in a zigzag path, the wire being wrapped in one direction around the odd number poles and in the opposite direction around the even number poles in a well-known manner. Although portion 9 of the wire is shown extending around each pole, it does not completely encircle each pole. However, the system would be the same if the wire were coiled a number of times around each pole before being carried to the next pole.

After the wire has been wrapped around all of the poles, it is started back from the last pole 8 toward the first pole 1 and terminal 11. This reversely extending length of the wire is referred to herein as the second portion 12 and is shown in dotted lines. Like the first portion 9 of the wire, it is wrapped around each pole in succession and in the same direction as the first portion. When it gets back to the first pole, it can be connected to terminal 11 or, as shown, a third portion 13 of the wire (in solid line) can follow the first portion from pole 1 to pole 8 and then a fourth portion 14 (dotted lines) will follow the second portion back and end at the second terminal 11. A wire can extend back and forth in this manner as many times as desired.

Assuming that direct current flows through the wire in the direction of the arrows, it will be seen that the direction of the magnetic flux lengthwise of the row of poles will be from left to right for the flux generated by conductor portions 9 and 13, but from right to left for the flux generated by conductor portions 12 and 14. The lines of flux lengthwise of the row of poles therefore will cancel each other and not detract from the strength of the flux around the individual poles.

The general system of winding just described is what is used in winding the magnetic return member 16 shown in FIGS. 2 and 3, except that the wire is wound a number of times around each pole before passing on to the next one. Member 16 is cylindrical and its cylindrical surface is provided with an even number of circumferentially spaced slots 17 extending lengthwise of it to form an even number of radial poles 18 to 25. The first portion 27 of a wire is wound around the first pole 18 in one direction, around the next pole 19 in the opposite direction, and so on from pole to pole until the last pole 25 has been wrapped. The wire then is reversed and a second portion 28 of it is wound around the seventh pole in the same direction as before and then around each successive pole until the first pole 18 has been wound again. Both ends of the wire therefore come off the coil 29 on the first pole and can be connected to terminals or the like adjacent to it. When the device is inserted in an annular ceramic body that is to be magnetized and the wire is connected in a direct current circuit, well-defined north and south poles of greater strength than heretofore will be produced.

The fixture shown in FIG. 4 is wound in the same way as the one just described. The difference between the two devices is that the magnetic return member 31 in FIG. 4 is annular and has its slots 32 and poles 33 at the inside. A single wire 34 extends from one pole around the return member to the final pole and then is reversed and extends back to the first pole.

The magnetizing fixture shown in the remaining figures of the drawings is, in effect, a two-turn coil, the two turns extending in opposite directions, but it does not use wire as an electrical conductor. Instead, it uses heavy copper members for that purpose. The magnetic return member is a heavy ring 36, from the inside of which an even number of plate-like poles 37 extend radially inward. The inner ends of the poles are spaced apart around an open center large enough to receive the body that is to be magnetized. The electrical conductor has only two portions. The first or outer portion is a rigid annular member 38, and the second or inner portion is a similar member 39 having the same general shape. They are concentric with each other and with the outer ring 36, but the two conductor members are wider than the ring and project from its opposite sides. Their projecting portions are spaced apart by insulating rings 40.

The outer ring-like conductor 38 is provided with circumferentially spaced radial slots 42 corresponding in number to the number of poles, which the slots receive. The poles are surrounded by layers of any suitable insulation 43. As shown in FIG. 12, alternate slots are open at one side of the conductor member, while all except one of the remaining slots are open at the other side of that member. The slot that is the exception is open at both ends, so that the conductor member does not form a continuous circle but is split to provide two closely adjacent ends. The result is that the conductor member forms a zigzag conductor extending around the inside or ring 36, from which it is insulated by any suitable insulation 44 between them. This conductor member has integral laterally projecting end portions 45 and 46, and the former is longer than the other and is secured to a terminal block 47.

The inner conductor 39 likewise is provided with radial slots 50 extending inwardly from its opposite sides in alternating relation, and it also has one slot 51 that is open at both ends as shown in FIG. 13. This slot does not register with the corresponding slot of the outer conductor but it preferably registers with the slot next to it. In any event, the inner member is so related to the outer one that an open end of a slot 50 in the inner member is beside the closed end of the slot with which it registers in the outer member. The inner conductor member has laterally-projecting integral end portions 52 and 53, with the longer portion 52 connected to a second terminal block 54 that may be spaced from terminal 47 by an insulating strip 55.

To electrically connect the two circular conductor members so that they will form one continuous electrical conductor, a bridging member 57 is secured to the slightly projecting ends 46 and 53 of the two conductor members, as shown in FIGS. 6 to 8. Electric current then can flow, for example, from the first terminal 47 around through the outer conductor member 38 in one direction, through bridging member 57 and then back in the opposite direction through the inner conductor member 39 to the second terminal 54. The advantage of this device in terms of greater magnetizing capacity is the same as the first two embodiments of the invention.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A device for magnetizing circular magnets, comprising a circular magnetic return member provided with an even number of laterally spaced radial poles, and a continuous electrical conductor having a first portion extending from pole to pole around said member in one direction and having a second portion extending back in reverse direction around said member from pole to pole, said first portion of the conductor extending around the odd number poles in one direction and around the even number poles in the opposite direction, and said second portion of the conductor extending in the same direction around each pole as said first portion, the conductor being insulated from said poles.

2. A device according to claim 1, in which said conductor portions are spaced radially from each other.

3. A device for magnetizing circular magnets, comprising a magnetic return member having a cylindrical surface provided with an even number of laterally spaced slots extending lengthwise of the member and forming an even member of parallel radial poles between them, a pair of electric terminals, and an insulated wire connecting the terminals, the wire having a first portion extending from pole to pole from one of said terminals around said member in one direction and having a second portion extending from said first portion back in reverse direction around said member from pole to pole to the other terminal, said first portion of the wire extending around the odd number poles in one direction and around the even number poles in the opposite direction, and the second portion of the wire extending in the same direction around each pole as said first portion.

4. A device for magnetizing circular magnets, comprising a metal ring, an even number of circumferentially spaced poles secured to the inside of the ring and extending toward its center, the inner ends of the poles being spaced apart, an outer rigid metal conductor member of annular shape inside said ring but spaced therefrom, said member being provided with circumferentially spaced slots extending radially therethrough and receiving said poles, alternate slots being open at one predetermined side of said member and all but one of the remaining slots being open at the opposite side of said member, said one slot being open at both ends to form two ends for the conductor member, an inner rigid conductor member of the same general shape as the outer one, the inner member being disposed inside the outer member but spaced therefrom, insulation between the conductor members and said ring and poles, the slots forming the ends of the conductors being out of registry with each other, the open end of another of the slots in the inner member being disposed beside the closed end of the adjoining slot in the outer member, means electrically connecting one end of the outer conductor member to the corresponding end of the inner member, and terminals connected to the other two ends of said members.

References Cited in the file of this patent

UNITED STATES PATENTS

| | | |
|---|---|---|
| 1,975,175 | Scofield | Oct. 2, 1934 |
| 2,248,272 | Jurak | July 8, 1941 |
| 2,792,532 | Becker | May 14, 1957 |
| 2,897,417 | MacDonough et al. | July 28, 1959 |